(No Model.)
R. C. KILLAM.
PRESSER ROLL.
No. 335,593. Patented Feb. 9, 1886.
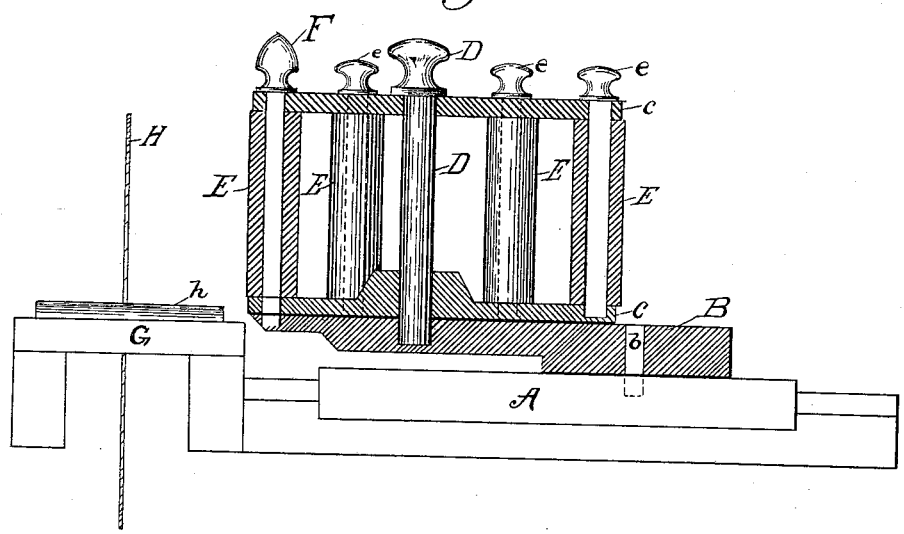
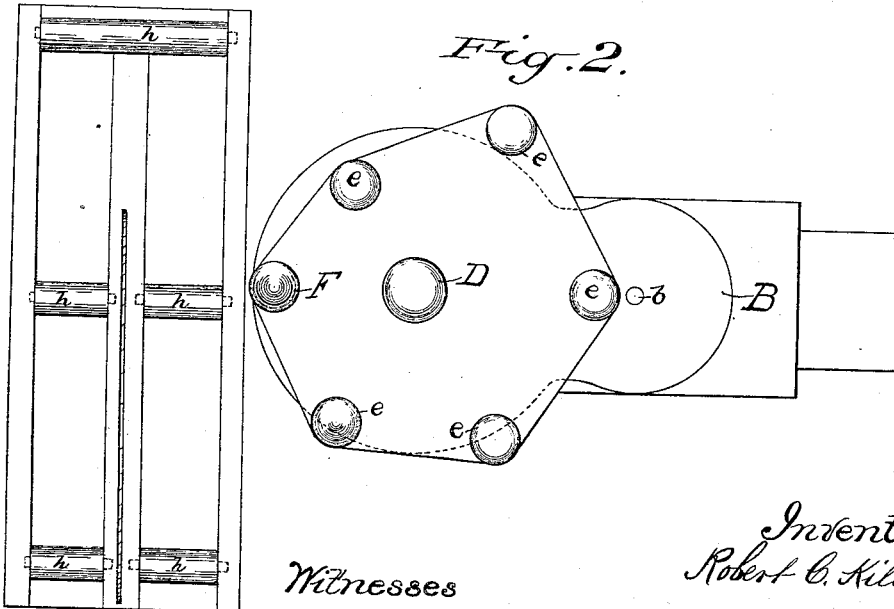
Witnesses
R. B. Smith
R. H. Neal
Inventor
Robert C. Killam
Attorney
John Galt

UNITED STATES PATENT OFFICE.

ROBERT C. KILLAM, OF MONCTON, NEW BRUNSWICK, CANADA, ASSIGNOR TO ALEXANDER L. WRIGHT AND ALSTON CUSHING, BOTH OF SAME PLACE.

PRESSER-ROLL.

SPECIFICATION forming part of Letters Patent No. 335,593, dated February 9, 1886.

Application filed November 28, 1884. Serial No. 149,135. (No model.)

*To all whom it may concern:*

Be it known that I, ROBERT C. KILLAM, of the town of Moncton, Province of New Brunswick, Canada, have invented certain new and useful Improvements in Press-Roller Machines; and I do hereby declare the following to be a full, clear, and exact description, sufficient to enable others skilled in the art to which the said invention appertains to make and use the same, reference being had to the accompanying drawings, in which—

Figure 1 is a section through the revolving roller-bed and connected parts of a press-roller machine embodying my invention. Fig. 2 is a plan of the same, showing saw-bed with feed-rollers and the position of press-roller machine.

My invention relates to press-roller machines for holding logs in position for sawing into boards or planks of any desired thickness; and said invention relates to that class of press-roller machines wherein there are two or more press-rollers carried upon a revolving roller-bed.

The object of my invention is to increase the working capacity and speed of adjusting-machines of this class.

In the drawings similar letters refer to similar parts in both views.

Upon the main frame A of the machine rests the revolving table B, held in place and revolving on the pin $b$, suitably made. This revolving table carries a revolving roller-case, C C′, held in place and revolving or rotating on the pin D. This roller-case contains two or more (in the drawings are six) rollers, E E′ E² E³ E⁴ E⁵, rotating on pins $e\ e'\ e^2\ e^3\ e^4\ e^5$, passing down from the upper side of the said roller-case through the rollers and into the lower side or bottom of the roller-case. This roller-case may be locked into any desired position by means of the pin F, which passes through the bottom of the roller-case and into table below. This pin may be made to act as the axis of any one of the rollers, or can be made to act independently. The drawings show it in the former position and acting as the axis of the roller marked E. This pin I also make with a higher head than the rest, so that it can be readily detected from the others when it is desired to alter the position of the roller-case and bring another roller into position.

The main frame A is fastened securely to the side of the saw-bed G, upon which the logs to be cut are placed and fed to the saw H by the feed-rollers $h$, the rollers E of the machine being the guide by which the thickness of the plank or board to be cut is regulated. The rollers E E′, &c., being placed at different distances from the center pin, D, of the case, and the said pin or center being always the same distance from the side of the saw H, it will be easily understood that by turning the roller-case round upon its center D the distance from the side of the saw to the roller then brought into position will be greater or less than the preceding one, so that by regulating the distance of these various rollers to the side of the saw I can change with great ease, rapidity, and correctness the thickness of the timber to be cut.

The table B is made to turn upon the pin $b$, so that when it is desired to cut thicker planks than the rollers in the case C C′ are set for the said table may be turned around so as to leave the saw-bed clear.

I am aware that prior to my invention press-roller machines have been made with vertical rollers. I therefore do not claim such a combination, broadly; but, Having described the invention, what I claim as new, and desire to secure by Letters Patent, is—

1. The combination, in a press-roller machine, of two or more vertical rollers contained in a rotating roller-case, C C′, pivoted on the table B by the pin $b$, all substantially as set forth.

2. The combination, in a press-roller machine, of the rotating roller-case C C′ with the locking-pin F and the table B, pivoted on the frame A at the point $b$, all substantially as described.

ROBERT C. KILLAM.

Witnesses:
JOHN GALT,
C. A. STEEVES.